United States Patent [19]
Steele

[11] Patent Number: 5,911,421
[45] Date of Patent: Jun. 15, 1999

[54] SEALED COLLET HAVING IMPROVED RADIAL FLEXIBILITY FOR FACILITATING REMOVAL FROM A LOCKNUT

[75] Inventor: Jack W. Steele, Middlefield, Ohio

[73] Assignee: Kennametal Inc., Latrobe, Pa.

[21] Appl. No.: 08/847,994

[22] Filed: Apr. 18, 1997

[51] Int. Cl.[6] .............................. B23B 5/34; B23B 31/20; B23B 31/10; B23B 31/16

[52] U.S. Cl. ........................ 279/46.9; 279/42; 279/43.5; 279/43.7; 279/43.9; 279/46.5; 279/46.7; 279/48; 279/52; 279/56; 279/157

[58] Field of Search ........................ 279/42, 43.5, 43.7, 279/43.9, 46.5, 46.7, 46.9, 48, 52, 56, 157

[56] References Cited

U.S. PATENT DOCUMENTS

| | | |
|---|---|---|
| 2,879,069 | 3/1959 | Swanson . |
| 3,889,962 | 6/1975 | Parsons ..................................... 279/46 |
| 3,905,609 | 9/1975 | Sussman . |
| 3,907,729 | 9/1975 | Burkey et al. . |
| 4,072,084 | 2/1978 | Knight, Jr. et al. . |
| 4,251,084 | 2/1981 | Franklin . |
| 4,858,938 | 8/1989 | Terwilliger et al. ....................... 279/57 |
| 5,018,915 | 5/1991 | Inokuma et al. . |
| 5,324,050 | 6/1994 | Kanaan . |
| 5,405,155 | 4/1995 | Kanaan et al. . |
| 5,522,605 | 6/1996 | Lewis et al. ............................... 279/56 |
| 5,567,093 | 10/1996 | Richmond . |
| 5,580,197 | 12/1996 | Rohm . |
| 5,590,985 | 1/1997 | Mack . |

FOREIGN PATENT DOCUMENTS

| | | | |
|---|---|---|---|
| 3114786 | 1/1983 | Germany ............................... | 279/157 |
| 963709 | 3/1981 | U.S.S.R. . | |
| 1245418 | 9/1971 | United Kingdom .................. | 279/46.7 |

*Primary Examiner*—Andrea L. Pitts
*Assistant Examiner*—Mark T. Henderson
*Attorney, Agent, or Firm*—John M. Vasuta

[57] ABSTRACT

A sealed collet having improved radial flexibility is provided for facilitating removal from a locknut of a chuck assembly. The sealed collet includes a collet body formed from a tubular configuration of elongated gripping fingers separated by elongated slots which render the body radially resilient in response to pressure applied by a locknut. The slots are filled with a bonding agent, which may be a silicon rubber compound, for preventing dirt and debris from entering the collet slots and for preventing pressurized coolant intended to flow through a bore in a tool shank from flowing through the walls of the collet body. To increase the radial compressibility of the collet, agent-free gaps are provided in the slots immediately behind a distal portion of the collet body. In the preferred embodiment, the length of the agent-free gap is between 20% and 30% of the overall length of its respective slot. The location of the gaps immediately behind the distal end of the collet body advantageously increases the radial compressibility of the collet while allowing the bonding agent in the slots to continue to prevent debris from entering the collet.

16 Claims, 2 Drawing Sheets

SEALED COLLET HAVING IMPROVED RADIAL FLEXIBILITY FOR FACILITATING REMOVAL FROM A LOCKNUT

BACKGROUND OF THE INVENTION

This invention generally relates to sealed collets wherein the slots between the collet fingers are filled with a bonding agent to maintain a flow of pressurized coolant through the interior of the collet. It is specifically concerned with an improved sealed collet having agent-free gaps in the collet slots for increasing the radial flexibility of the collet body, which in turn facilitates the removal of the collet from the locknut of a chuck assembly.

Collets for use in tool-holding chuck assemblies are well known in the prior art. Such collets generally comprise a tubular body formed from a plurality of elongated, flexible steel fingers. The fingers are separated by longitudinal slots that impart some degree of radial flexibility to the collet which allows it to selectively grip the shank of a rotating tool such as a drill bit. Adjacent gripping fingers are interconnected by an alternating pattern of metal webs to form a one-piece collet body. In operation, the collet body is inserted in a complementary-shaped opening in a chuck shaft so that its distal end projects out of the shaft. An annular locknut having an inner diameter screw thread that matches an outer diameter screw thread on the shaft is then installed over the shaft and distal end of the collet body. The locknut has a nose ring with a frustro-conical cam surface that engages the distal end of the collet body and squeezes it radially inwardly as the locknut is screwed onto the chuck shaft. The radial compression that the locknut applies to the distal end of the collet body flexes the body inwardly, creating a gripping force between the inner diameter of the collet body and a tool shank inserted therein.

Sealed or bonded collets are also known in the prior art. In such collets, the slots separating the individual collet fingers are filled with a silicon-based rubber compound for two reasons. First, the filling of the collet slots with such a compound prevents pressurized coolant intended to flow through a bore in a gripped tool shank from flowing away from the shank and out through the walls of the collet body. Second, the bonding agent prevents the entry of dirt, metal swarf, and other debris from entering the collet slots and lodging between the shaft and the inner surface of the collet fingers. This function is important, as the presence of dirt or other debris in such locations can adversely affect the ability of the collet to uniformly grip the outer surface of the shank of the tool, which in turn can result in an off-center grip that might seriously compromise the accuracy of the bores or other cuts made by the tool.

While such bonded collets have been found to work well for their intended purpose, the recent use of coolants under higher pressure (i.e., on the order to 1000–1500 psi) has necessitated the use of harder, stiffer bonding agents to prevent the formation of leak paths through the collet slots. These stiffer bonding agents are less compressible, and adversely interfere with the radial compressibility of the collet. In the past, when the coolant pressures were lower (i.e., under 1000 psi) softer, more compressible bonding agents could be used to fill the slots of the body without any significant danger of leak paths occurring. The relatively more compressible bonding agents used in the prior art did not stiffen the radial resiliency of the collet to an extent where the collet body could not be readily compressed by the locknut to securely grip a tool shank. Even more importantly, the use of such pliant bonding agents would not render the distal end of the collet body so stiff as to interfere with the manual removal of the locknut if and when it became necessary to change the collet body to grip a shaft of a different size. Unfortunately, the use of stiffer bonding agents, such as one sold under the trademark SUPERFLEX 587 and manufactured by Loctite, Inc., located in Rocky Hill, Conn., has not only reduced the radial compressibility of the collet body to the extent to where manual compression around a shaft via the locknut is difficult, but has further made it very difficult for a system operator to manually separate the collet body from the locknut when a change of collet becomes necessary.

Clearly, there is a need for an improved collet body that is radially compressible to an extent to where the gripping of tool shanks and the removal of the locknut is easily performed by a system operator, but yet which can conduct high pressure coolant streams while preventing leakage through the collet slots. Ideally, such an improved sealed collet should not involve any redesign or machining of conventional collet bodies and locknuts, and should be installable onto existing collets (sealed or otherwise) with a minimum amount of effort and expense. Finally, such an improved sealed collet should still be able to resist the entry of dirt, debris, and metal swarf between the collet fingers and a gripped tool shaft.

SUMMARY OF THE INVENTION

Generally speaking, the invention is an improved sealed collet of the type including a tubular body formed from a plurality of gripping fingers that are separated by elongated slots filled with a bonding agent, wherein agent-free gaps are provided in the slots of the collet body for increasing the radial flexibility of the collet. In the preferred embodiment, the tubular collet body includes a distal end that is radially compressible by a nose ring of a locknut, and the agent-free gaps are disposed immediately behind this distal end. The inventor has surprisingly found that such an arrangement substantially increases the radial compressibility of the distal end of the collet body while still maintaining a sufficient amount of bonding agent in the segment of the slots traversing the distal collet end to effectively prevent dirt, swarf, and other debris from entering the slots of the collet body, and the space between a tool shank and the inner diameter of the collet gripping fingers.

In a preferred embodiment of the invention, the agent-free gap in each of the slots of the collet body has a length of between about 10% to 45% of the overall length of its respective slot. In a more preferred embodiment of the invention, the aforementioned gap has a length of between about 15 to 35% of the length of its respective slot. In the most preferred embodiment of the invention, the agent-free gap has a length of between about 20%–30% of the overall length of its respective slot.

The distal end of the collet body may include an annular cam surface for engaging the cam surface of the locknut incident to a collet compression operation and an ledge behind the cam surface for engaging a shoulder of the locknut incident to a collet removal operation. The ledge may include projecting portions for engaging the locknut shoulder, and recessed portions between the projecting portions for facilitating the disengagement of the locknut shoulder from the ledge incident to removing a collet body from the locknut. These recessed portions of the ledge, in combination with the increased radial compressibility of the distal collet end provided by the agent-free gaps in the collet slots, result in a chuck assembly whose collet is easily removable from the locknut whenever it becomes necessary to exchange or replace the collet.

BRIEF DESCRIPTION OF THE SEVERAL FIGURES

DETAILED DESCRIPTION OF THE PREFERRED EMBODIMENT

Figure 1:
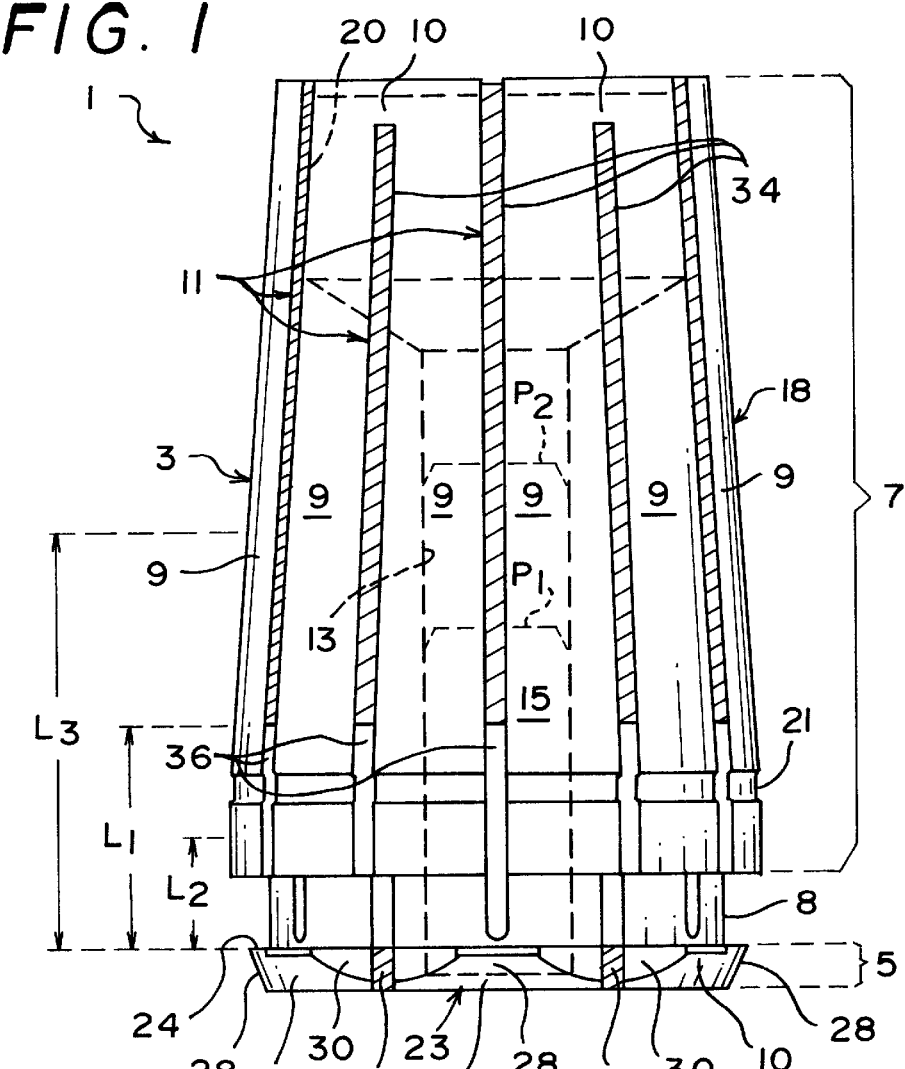
FIG. 1 is a side view of the sealed collet of the invention.
Figure 2:
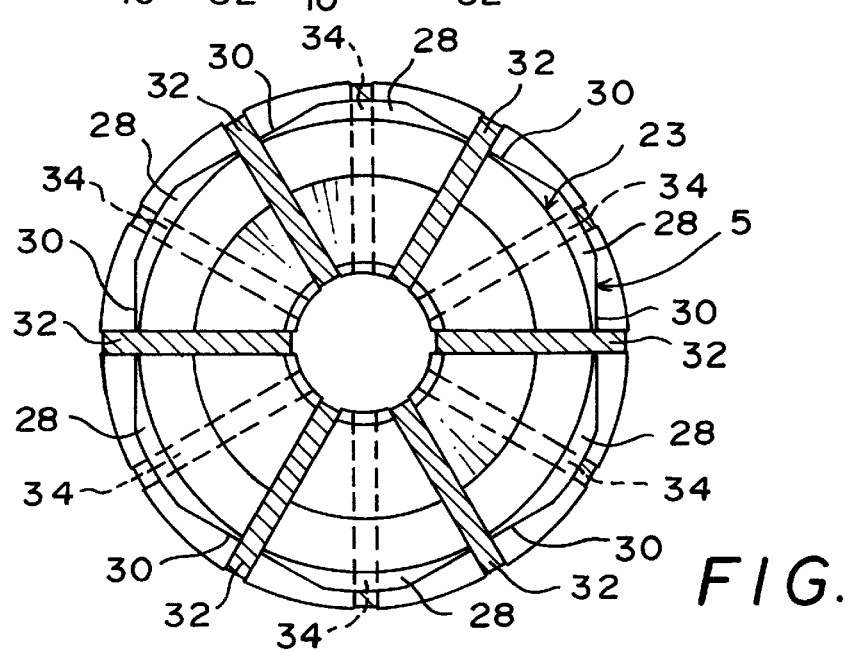
FIG. 2 is an end view of the collet illustrated in FIG. 1.

With reference to FIGS. 1 and 2, wherein like reference numerals designate like components throughout all the several Figures, the sealed collet of the invention 1 generally comprises a tubular body 3 having a distal end 5 and a proximal end 7. The distal and proximal ends 5,7 are separated by an annular recess 8 as shown in FIG. 1. The tubular body 3 is formed from a generally parallel array of elongated gripping fingers 9 interconnected by webs 10 of the same resilient steel alloy that forms the entire tubular body 3. The gripping fingers 9 are separated by elongated slots 11 as shown. The presence of the slots 11 allows the body of the collet 3 to be radially compressed by the locknut of a chuck assembly to grip the shaft of a tool (as will be described in more detail hereinafter).

Figure 3:
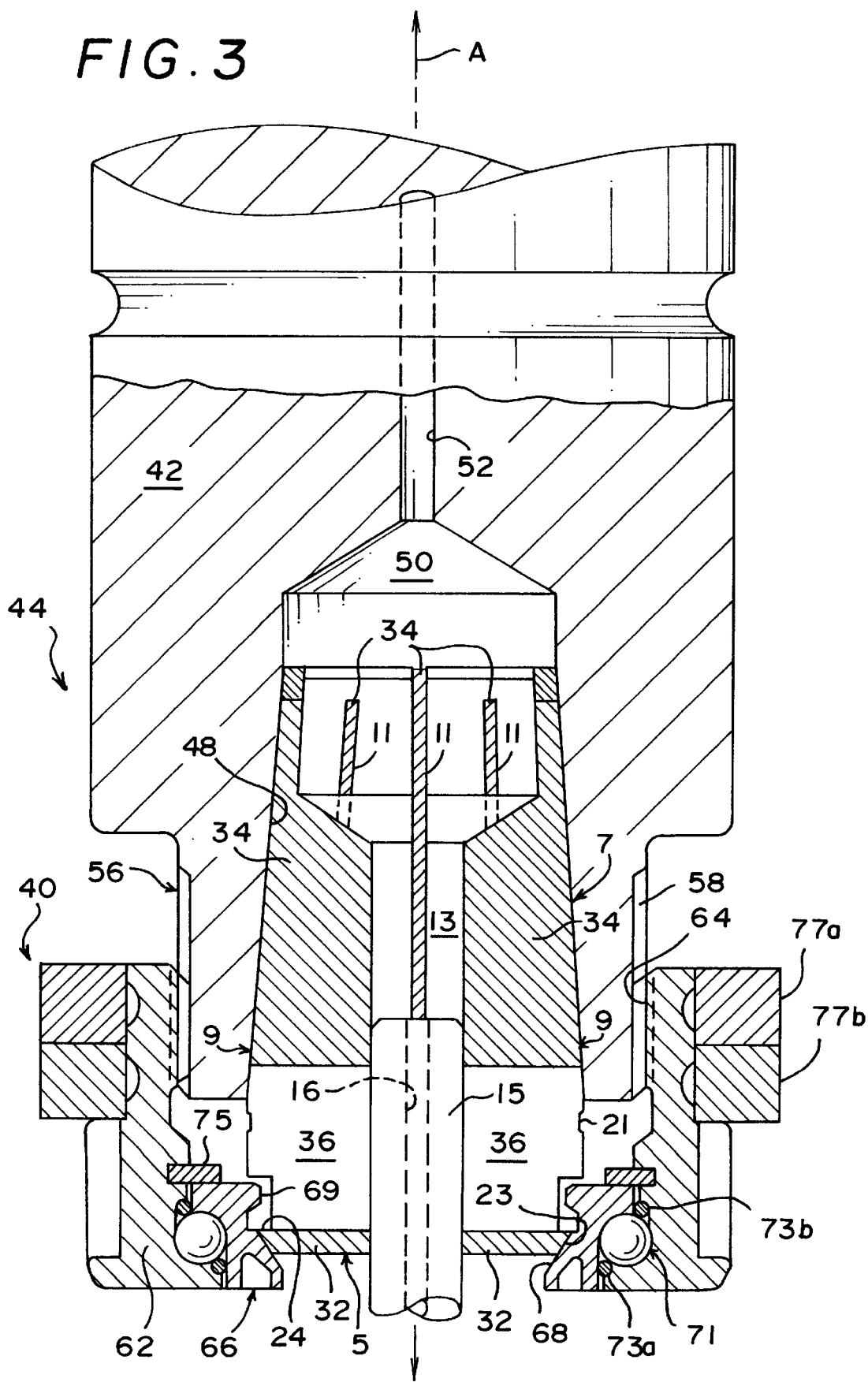
FIG. 3 is a side cross-sectional view of the sealed collet of the invention mounted in a chuck assembly.

Turning now to the interior of the collet body 3, a cylindrically-shaped passageway 13 is concentrically provided along the axis of rotation of the collet 1 for receiving the shaft 15 of a tool which may be, for example, a drill bit. Such tool shafts 13 often include a coolant bore 16 (as seen in FIG. 3) for conducting a pressurized coolant to the cutting situs. The shaft receiving passageway 15 flares out into a frustro-conical portion 18 toward the proximal end 7 of the collet body 3, which in turn joins a counterbored interior portion 20. The counterbored portion 20 and frustro-conical portion 18 direct pressurized coolant flowing from an opening in a chuck shaft (illustrated in FIG. 3) to the shaft receiving passageway 13. The counterbored portion 20 also increases the overall radial flexibility of the interconnected gripping fingers 9.

Turning now to the exterior of the tubular body 3, an annular guide groove 21 is provided near the distal end to provide a visual indication as to whether or not the collet body 3 is inserted at a proper depth into a chuck shaft. The distal end 5 includes an annular cam surface 23 along its circumferential edge which cooperates with the cam surface of a locknut to radially compress the gripping fingers 9 into gripping engagement with a tool shaft 15. A ledge 24 is provided behind the annular cam surface 23 to facilitate the removal of the collet body 3 from a chuck shaft via a locknut as described in more detail hereinafter with respect to FIG. 3. As best seen in FIG. 2, the annular ledge 24 is formed from six projected portions 28 uniformly spaced around the periphery of the body 3. Each of the projections 28 is flanked by a radially recessed portion 30 in order to further assist the operator of the chuck to remove a locknut from the collet body 3 when the locknut is tilted relative to the collet body 3 and pulled away.

In order to prevent dirt, debris, and metal swarf from entering the chuck assembly that the collet 1 forms a part of, a resilient bonding agent 32 fills the distal end segments of the elongated slots 11. In order to prevent pressurized coolant from escaping through the walls of the collet 1 when a tool shaft 15 is secured in the passageway 13, a resilient bonding agent 34 fills the proximal portion of the collet slots 11, as may best be seen in FIG. 1. In the preferred embodiment of the invention, the bonding agent used to fill the portions 32, 34 may be one sold under the trademark SUPERFLEX 587 and manufactured by Loctite, Inc., located in Rocky Hill, Conn. Such a bonding agent is formed from a silicon rubber based compound that has sufficient rigidity to successfully prevent the leakage of coolants pressurized to within the range of between about 1000 to 1500 psi from leaking through the walls of the collet 1 when such coolants are introduced into the counterbored interior 20 of the collet 1 and on through the cylindrically-shaped passageway 13.

To prevent the relatively stiff bonding agent 32,34 that fills the slots 11 from interfering excessively with the radial compressibility of the distal end 5 of the collet 1, a gap 36 is provided in the bonding agent that extends between the ledge 24 of the distal end 5, and a point just below the annular groove 21 on the proximal end 7 of the collet 1. In the preferred embodiment, the length L1 of the gap 36 present in each of the slots 11 is approximately 25% of the overall length of its respective slot. However, the invention would still be effective to substantially increase the radial flexibility of the collet 1 if it were only as long as $L_2$ illustrated in FIG. 1, which is approximately 10% of the overall length of the slots 11. The gap 36 would also be effective for its intended purpose if it were as long as $L_3$, which constitutes approximately 45% of the overall length of the slots 11. However, if such an elongated form of the agent-free gap 36 is used, it will be necessary to insert any coolant-conducting tool shaft rearwardly from a normal position indicated by $P_1$ to a deeper position indicate by $P_2$, so that no gaps are present between the tool shaft 15 and the proximal edges of the gaps 36 that would allow pressurized coolant through flow radially outward through the walls of the collet body 3. The invention may encompass even greater gap lengths than $L_3$ in cases where the tool shaft 15 can be inserted even deeper than the position indicated at $P_2$.

FIG. 3 illustrates the operation of the sealed collet 1 of the invention. The collet 1 is designed to be operated in conjunction with a locknut 40 and a chuck shaft 42, the combination 1, 40, and 42 of which forms a chuck assembly 44. The chuck shaft 42 has a frustro-conical cavity 48 that is complementary in shape to the proximal end 7 of the collet body 3. The cavity 48 terminates in a conical end portion 50 which in turn leads to a coolant conducting passageway 52. The passageway 52 extends colinearly with the axis of rotation A of the chuck shaft 42. Opposite the passageway 52, the chuck shaft 42 terminates in a annularly recessed end portion 56. A screw thread 58 circumscribes the outer diameter of shaft end portion 56.

The locknut or locknut 40 is formed from an annular housing 62 having a screw thread 64 that circumscribes its inner diameter as shown. Screw thread 64 is engagable with the screw thread 58 that circumscribes the recessed end portion 56 of shaft 42. The opposite side of the locknut housing 62 carries a nose ring 66 having a cam surface 68. As is evident from the Figure, the cam surface 68 is a frustro-conical surface complementary in shape to the annular cam surface 23 of the distal end 5 of collet 1. Immediately behind the cam surface 68 of the nose ring 66 is an annular shoulder 69 which fits into the annular recess of the collet body 3 when the locknut 40 is assembled over the collet 1. As will be discussed in more detail hereinafter, shoulder 69 is used to withdraw the collet body 3 from the frustro-conical cavity 48 when the locknut 40 is turned so as to detach from the end of the chuck shaft 42. A ball bearing assembly 71 is disposed between the nose ring 66 and the distal end of the annular housing 62 for allowing the nose ring 66 to apply radially compressive forces to the distal end 5 of the collet body 3 without applying torsional forces generated by the turning of the annular housing 62 by the system operator. A pair of O-rings 73*a,b* are provided on either side of the bearing assembly 71 in order to prevent the entry of dust and debris in this location of the locknut 40. A snap ring 75 retains the nose ring 66 and bearing assembly 71 in place within the annular housing 62. Finally, in this particular embodiment of the locknut 40, a pair of balancing rings 77*a,b* circumscribe the proximal periphery of the housing 62 for allowing the chuck assembly 44 to be rotatably balanced. Additional details of the locknut 40 and chuck shaft 42 may be found in U.S. Pat. No. 5,522,605, assigned to Kennametal Inc., located in Latrobe, Pa., the entire specification of which is incorporated herein by reference.

In operation, the system operator may first seat the collet body 3 into the frustro-conical cavity 48 of the chuck shaft 42 until the annular groove 21 is approximately even with the distal edge of the shaft 42. Such seating insures that the proximal end 7 of the collet body 3 assumes the position within the cavity 48 illustrated in FIG. 3. Next, the system operator engages the screw threads 64 of the locknut 40 with the screw threads 56 of the chuck shaft 42, and turns the locknut until the annular shoulder 69 of the nose ring 66 "snaps" over the ledge 24 of the distal end 5 of the collet body 3. The chuck assembly 64 is now ready to receive the shaft 15 of a turning tool, such as a drill bit. The system operator installs such a shaft 15 into the cylindrically-shaped passageway 13 of the collet body 3, making sure that the shaft 15 is inserted deeply enough so as to completely traverse the gap 36 in the bonding agent between the slots 11. Such positioning insures that the bonding agent 34 that fills the slots 11 in the proximal end 7 in the collet body 3 will effectively contain any pressurized coolant that flows through coolant passageway 52 so that the pressurized coolant is directed solely through coolant bore 16 of the tool shaft 15, and not radially through the walls of the collet body 3. The system operator then manually screws the locknut 40 toward the end of the chuck shaft 42 so that the cam surface 68 of the nose ring 66 radially compresses the proximal end 7 of the collet body 3. Such an action not only rigidly interconnects the tool shaft 15 to the inner diameter of the collet body 3, but further creates a fluid tight seal between the interior of the sealed collet body 3 and the shaft 15. After the locknut 40 has been so tightened, the chuck assembly 44 and the tool attached to the shaft 15 is now ready for use. During such use, the bonding agent 32 that fills the slot segments 9 of the distal end 5 of the collet body 3 prevents dirt, debris, and metal swarf from entering the interior of the collet body 3, while the bonding agent 34 filling the slots 11 operate in the previously-described manner to prevent pressurized coolant from flowing out through the collet body 3.

When the system operator desires to change the collet 1 and associated tool, he unscrews the locknut 40 until the annular shoulder 69 catches onto the ledge 24 located at the distal end 5 of the collet body 3. From this point on, the locknut 40 acts as a kind of "screw jack" that pulls the collet 1 out of the cavity 48 of the chuck shaft 42. The increased radial compressibility of the distal end of the collet body 3, in association with the reduced interference between the annular shoulder 69 and ledge 24 provided by the recessed portions 30 around the distal end 5, allow the system operator to easily snap the distal end 5 of the collet off of the annular shoulder 69 of the locknut 40, thereby completely detaching these two components, whereupon the system operator may exchange or replace the collet 1 of the chuck assembly 44. A second more preferred assembly method is to first snap the distal end 5 of the collet body 3 past the annular shoulder 69 of the locknut 40 thus forming a subassembly of collet 1 and locknut 40. The tool shaft 15, also referred to as a shank 15, to be gripped is then inserted in the cylindrically-shaped passageway 13 of the collet body 3. The resulting subassembly of the tool shank 15, collet body 3, and locknut 40 can then be installed into the chuck assembly 44. This second method advantageously results in less binding action between the tool shank 15 and collet body 3 when the shank 15 is inserted therein.

While this invention has been described with respect to a preferred embodiment, various additions, modifications, and variations will become evident to persons of ordinary skill in the art. All such additions, modifications, and variations are intended to be encompassed within the scope of this invention, which is limited only by the claims appended hereto.

What is claimed:

1. A sealed collet comprising a tubular body formed from a plurality of elongated gripping fingers separated by elongated slots for rendering said body radially resilient in response to pressure applied by a locknut, said slots being filled with a bonding agent which includes an elongated agent-free gap in the slots of the collet body for increasing the radial flexibility of the body and facilitating the removal of a locknut therefrom, wherein said tubular collet body includes a proximate end and a distal end separated by an annular recess, the distal end is radially compressible by a cam surface of said locknut, and at least some of said slots extend through said distal end of said body, and wherein said elongated agent-free gap in each of said slots is located in at least one of the annular recess and proximate end.

2. The sealed collet defined in claim 1, wherein said agent-free gap in each of said slots has a length of between 10% to 45% of the length of its respective slot.

3. The sealed collet of claim 1, wherein said agent-free gap in each of said slots has a length of between about 15% to 35% of the length of its respective slot.

4. The sealed collet defined in claim 1, wherein said agent-free gap in each of said slots has a length of between about 20% and 30% of the length of its respective slot.

5. The sealed collet defined in claim 1, wherein said distal end of said collet body includes an annular cam surface for engaging said cam surface of said locknut incident to a collet compression operation, and an annular ledge for engaging a shoulder of said locknut incident to a collet removal operation.

6. The sealed collet defined in claim 5, wherein portions of said slots traverse said distal end of said collet body and are filled with said bonding agent, and said agent-free gap of each slot commences immediately behind said annular ledge of said distal end.

7. The sealed collet defined in claim 6, wherein said annular ledge includes projecting portions for engaging said locknut shoulder, and recessed portions between said projecting portions for facilitating the disengagement of said locknut shoulder from said annular ledge incident to removing said collet body from said locknut.

8. The sealed collet defined in claim 6, wherein said agent-filled slot portions traversing said distal end prevent debris from entering said collet body.

9. The sealed collet defined in claim 6, wherein said collet body includes a proximate end, and wherein said agent-filled portions of said slots traversing said proximal end prevent pressurized coolant from flowing out of said collet body.

10. A sealed collet comprising a tubular body formed from a plurality of elongated gripping fingers separated by elongated slots for rendering said body radially resilient, said body including a distal end that is radially compressible by a locknut, and a proximal end that is receivable in an opening of a drive shaft, said slots being filled with a bonding agent which includes an elongated, agent-free gap in the slots of the collet body, each gap being located immediately outside of the distal end of the body for increasing the radial flexibility of said distal end and facilitating the removal of a locknut therefrom.

11. The sealed collet defined in claim 10, wherein said agent-free gap in each of said slots has a length of between about 15% to 35% of the length of its respective slot.

12. The sealed collet defined in claim 10, wherein said agent-free gap in each of said slots has a length of between about 20% and 30% of the length of its respective slot.

13. The sealed collet defined in claim 10, wherein said distal end of said collet body includes an annular cam surface for engaging said locknut incident to a collet compression operation, and an annular ledge for engaging a shoulder of said locknut incident to a collet removal operation from a chuck shaft.

14. The sealed collet defined in claim 13, wherein each of said agent-free gaps commences immediately behind said annular ledge of the distal end of said collet body.

15. The sealed collet defined in claim 14, wherein said annular ledge includes projecting portions for engaging said locknut shoulder and recessed portions between said projecting portions for facilitating the disengagement of said locknut shoulder from said annular ledge incident to removing said collet body from said locknut.

16. The sealed collet defined in claim 10, wherein the depth of each of said slots is substantially filled with said bonding agent except for said agent-free gaps therein.

* * * * *